US009170909B2

(12) United States Patent
Howard

(10) Patent No.: US 9,170,909 B2
(45) Date of Patent: Oct. 27, 2015

(54) AUTOMATIC PARALLEL PERFORMANCE PROFILING SYSTEMS AND METHODS

(71) Applicant: Massively Parallel Technologies, Inc., Boulder, CO (US)

(72) Inventor: Kevin D. Howard, Tempe, AZ (US)

(73) Assignee: Massively Parallel Technologies, Inc., Boulder, CO (US)

( * ) Notice: Subject to any disclaimer, the term of this patent is extended or adjusted under 35 U.S.C. 154(b) by 323 days.

(21) Appl. No.: 13/909,781

(22) Filed: Jun. 4, 2013

(65) Prior Publication Data

US 2013/0346807 A1  Dec. 26, 2013

Related U.S. Application Data

(60) Provisional application No. 61/655,151, filed on Jun. 4, 2012.

(51) Int. Cl.
| | |
|---|---|
| *G06F 11/00* | (2006.01) |
| *G06F 11/30* | (2006.01) |
| *G06F 11/36* | (2006.01) |
| *G06F 11/34* | (2006.01) |
| *G06Q 10/00* | (2012.01) |

(52) U.S. Cl.
CPC ........ *G06F 11/3003* (2013.01); *G06F 11/3404* (2013.01); *G06F 11/3419* (2013.01); *G06F 11/3466* (2013.01); *G06F 11/3612* (2013.01); *G06Q 10/00* (2013.01); *G06F 2201/865* (2013.01); *Y02B 60/165* (2013.01)

(58) Field of Classification Search
CPC ......................................................... G06F 8/44
USPC ......................................................... 717/158
See application file for complete search history.

(56) References Cited

U.S. PATENT DOCUMENTS

2010/0036641 A1   2/2010   Lee et al.

FOREIGN PATENT DOCUMENTS

JP           11259433 A       9/1999

OTHER PUBLICATIONS

Nudd, G.R., et al. "PACE-A Tooset for the Performance Prediction of Parallel & Distributed Systems," Intl Journal High Performance Computing Applications 2000, vol. 54, No. 3, pp. 228-251.
Lobjois, L, et al. "Branch and Bound Algorithm Selection by Performance Prediction," IN:AAA1, 1998, pp. 353-358.
International Search Report in PCT/US2013/044114 dated Jul. 12, 2013, 9 pages.

*Primary Examiner* — Bryce Bonzo
*Assistant Examiner* — India Davis
(74) *Attorney, Agent, or Firm* — Lathrop & Gage LLP

(57) ABSTRACT

An automatic profiling system and method determines an algorithm profile including performance predictability and pricing of a parallel processing algorithm.

15 Claims, 7 Drawing Sheets

SMALLEST DATASET

| TEST NUMBER | INPUT NAME | INPUT VALUE | OUTPUT NAME | MIN VALUE | MAX VALUE | PASS/FAIL |
|---|---|---|---|---|---|---|
| 1 | VarIn | 32 | VarOut | 10 | 12 | |
| 2 | VarIn | 32 | VarOut | 10 | 12 | |
| 3 | VarIn | 32 | VarOut | 10 | 12 | |
| | | | | | | |

[EDIT]

AUTOMATIC PARALLEL PERFORMANCE PROFILING SYSTEMS AND METHODS

RELATED APPLICATIONS

This application claims the benefit of priority to U.S. Provisional Patent Application No. 61/655,151, filed Jun. 4, 2012 which is incorporated herein by reference. U.S. Patent Application Publication Number 2012/0036399 A1, titled "System and Method for Automated Software Application Development", filed Aug. 9, 2010, which provides details of the software development environment referenced herein is additionally incorporated by reference herewith.

BACKGROUND

Parallel processing systems of the art have only one processing speed for any particular application running a particular dataset. This is because the number of processing elements that are used to process the application are fixed at compile time. For a parallel processing system whose number of processing elements is not fixed at compile time, but instead can vary at execution time, there remains only one processing element selection criteria—CPU Hours. However, CPU Hours, the amount of time consumed by some number of processing elements, does not give an indication of performance because in order to indicate performance one must be able to predict the performance for some application processing some dataset with some number of processing elements.

SUMMARY OF THE INVENTION

Not all applications are amenable to such prediction. However, a large number of applications are amenable to prediction and for such applications it becomes possible to select the required performance. It also becomes possible, for the first time, to charge directly for parallel processing performance. To accomplish this requires a three step process: (1) Application performance predictability determination, (2) Predictable application performance profiling, and (3) Pricing.

The description below describes, among other things, a method for automatically determining a parallel performance profile of a parallel processing algorithm stored within memory, includes utilizing a profile stored as computer readable instructions within the memory and executable by a processor to record a total execution time for the algorithm to process test data for each of a plurality of iterations, wherein each iteration uses an increasing number of processing elements, and wherein the first iteration uses one processing element. The method may further include determining performance predictability of the algorithm based upon the determined execution time and processing errors. The method may be characterized such that the iterations repeat until an error occurs or until the total execution time for a current iteration is greater than the total execution time of a previous iteration.

The description below further describes a system for automatically determining a parallel performance profile of a parallel processing algorithm, the system may include: a processor and memory for storing a profiler having machine readable instructions that when executed by the processor determine a profile of the algorithm, the profiler comprising one at least one of: instructions for determining performance predictability of the parallel processing algorithm, and instructions for determining price of executing the parallel processing algorithm

BRIEF DESCRIPTION OF THE FIGURES

FIG. 3 shows one exemplary screen that allows a developer to enter input and expected output variables that are used for testing the selected algorithm of FIG. 2 during profiling by the profiler of FIG. 1, in an embodiment.

DETAILED DESCRIPTION OF THE EMBODIMENTS

Figure 1:
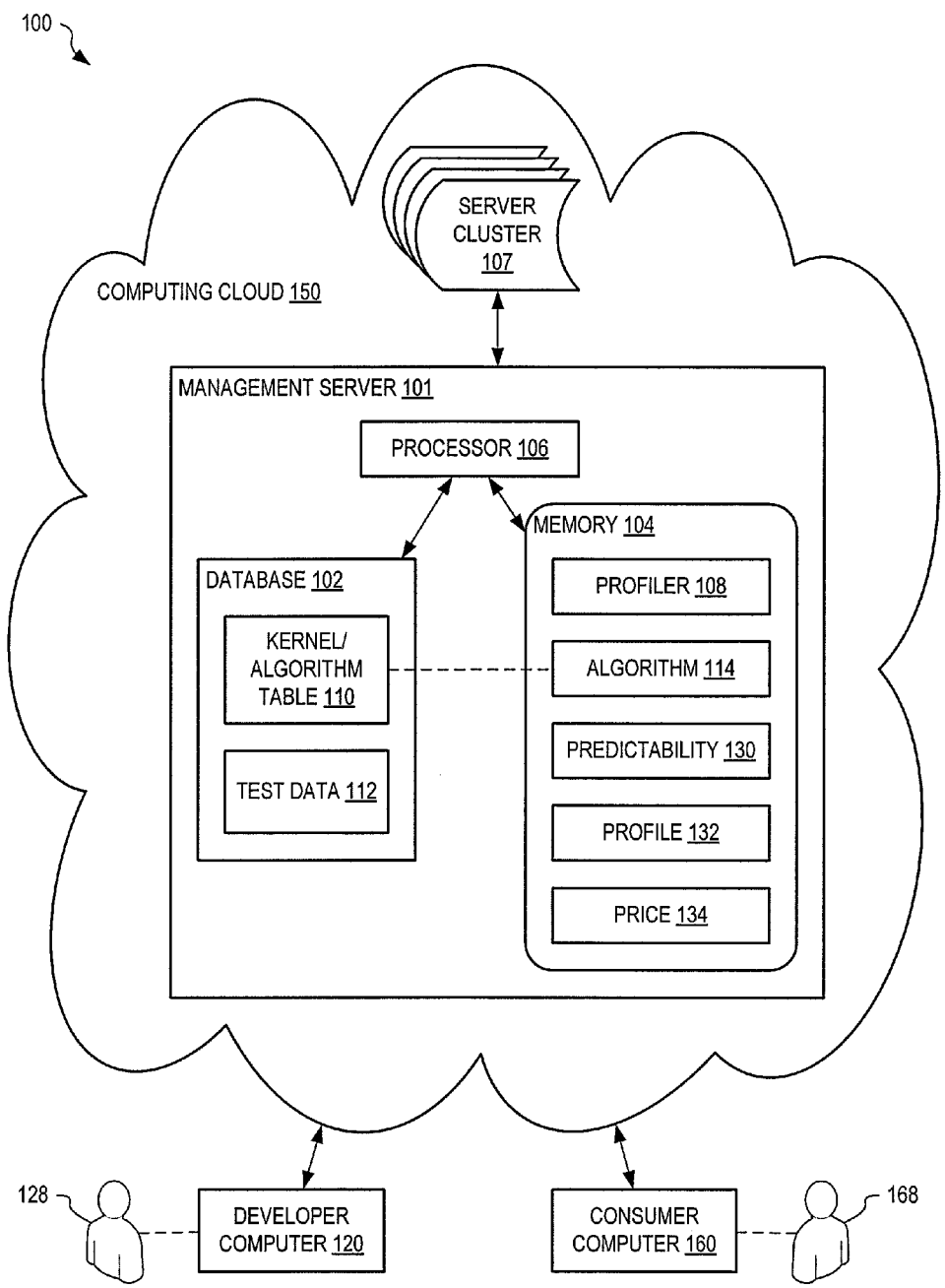
FIG. 1 shows one exemplary parallel processing development environment, having a server cluster and a management server, for determining an application performance predictability, an application performance profile, and application pricing, in an embodiment.

FIG. 1 shows one exemplary parallel processing development environment 100, having a server cluster 107 and a management server 101, for determining an application performance predictability, an application performance profile, and application pricing. Management server 101 includes a database 102, a memory 104, and a processor 106. Although shown as a single computer system, management server 101 may include multiple computer systems (e.g., computer servers) that are interconnected (e.g., using a computer network). Where implemented as multiple computer systems, these systems may be co-located and interconnected using a local area network, and/or distributed and interconnected using wide area networks (e.g., the Internet, dedicated networks, and so on). Database 102 is a data network storage device, for example.

Memory 104 may represent one or more of volatile memory (e.g., RAM, DRAM, static memory, and so on) and non-volatile memory (e.g., FLASH, magnetic media, optical media, and so on). Memory 104 is shown storing a profiler 108 that comprises machine readable instructions that when executed by processor 106 determines performance predictability 130, performance profile 132, and price 134 of algorithm 114 when run on server cluster 107. Performance predictability 130, performance profile 132, and price 134 of algorithm 114 allows a consumer 168 to select, using a consumer computer 160 to interact with development environment 100 for example, a desired performance and cost for running algorithm 114 of cluster server 107. Consumer computer 160 may utilize various interaction means known in the art such as mouse input, voice activated input, keyboard input, touch screen input, or any other forms of input/selection.

Determine Application Performance Predictability

Figure 2:
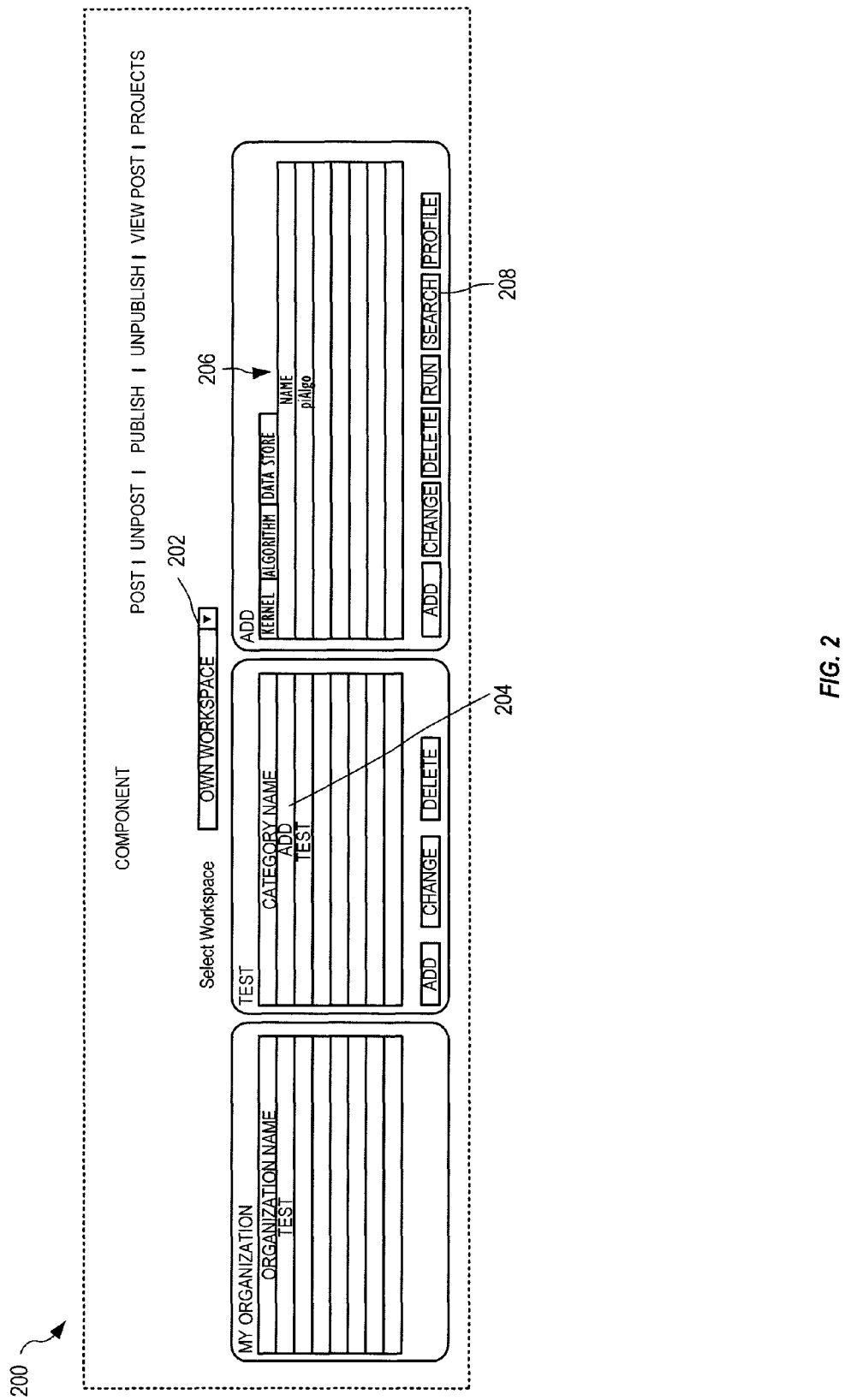
FIG. 2 shows one exemplary component screen that allows a developer, using a developer computer, to select an algorithm for profiling by the profiler if FIG. 1, in an embodiment.

FIG. 2 shows one exemplary component screen 200 that allows developer 128, using developer computer 120, to select algorithm 114 for profiling by profiler 108. First, on component screen 200, developer 128 selects a workspace (e.g., one of Own, Organization, and Public) using drop-down list 202, then selects a category 204, and finally selects algorithm 114 from algorithm list 206. Selecting the algorithm causes the Profile button 208 to become active. Developer 128 selects profile button 208 to initiate profiling of algorithm 114 by profiler 108.

FIG. 3 shows one exemplary screen 300 that allows developer 128 to enter input and expected output variables (e.g., stored as test data 112) that are used for testing algorithm 114 during profiling by profiler 108. In the example of FIG. 3, screen 300 prompts developer 128 to enter data for a smallest dataset size usable by algorithm 114. Other similar screens may be presented to allow developer 128 to enter input and expected output data for both a medium data set and a large dataset. These entered datasets are stored within database 102 as test data 112 for example. Profiler 108 then executes algorithm 114 using one processing elements of cluster server 107 and records the performance (e.g., profile) of execution of algorithm 114. For example, profiler 108 may record a total execution time taken by algorithm 114 to process test data 112 (where test data 112 contains the smallest dataset as provided by developer 128).

Next, algorithm 114 is executed to process test data 112 using two processing elements of cluster server 107, and profiler 108 records the total execution time taken by algorithm 114 to process test data 112. Profiler 108 continues iterations of executing algorithm 114 to process test data 112, using an increasing number of processing elements of cluster server 107 for each iteration, until either the total execution time for algorithm 114 to process test data 112 increases from the prior iteration or the system 100 runs out of processing elements to use. Each execution returns output variables as well as the total end-to-end processing time. Each time the processing completes then the expected output values are checked for correctness. If at any time the return values are outside of the expected range then the algorithm is deemed unstable, further processing is stopped and an error message of "Unstable Algorithm" is displayed to developer 128. If the algorithm aborts because of a programming error then further processing is stopped and an error message of "Unstable Algorithm" is displayed.

Any algorithm that is unstable (e.g., displaying "Unstable Algorithm") cannot be run or profiled until a new copy of the code has been uploaded. The name of unstable algorithms is displayed in red on the component screen. Every time the algorithm successfully completes processing a dataset for some processing element count then the processing time is displayed on a graph. Three datasets are given for each dataset size, labeled test-1, test-2, and test-3. If the processing time of any of tests is significantly different than the others then the algorithm is deemed unpredictable and the warning message "Unpredictable Algorithm" is displayed to the developer 128. Unpredictable algorithms are still executable, but rather than use performance as the selection criteria (see FIG. 5), CPU Hours are used instead (see FIG. 6).

Figure 4:
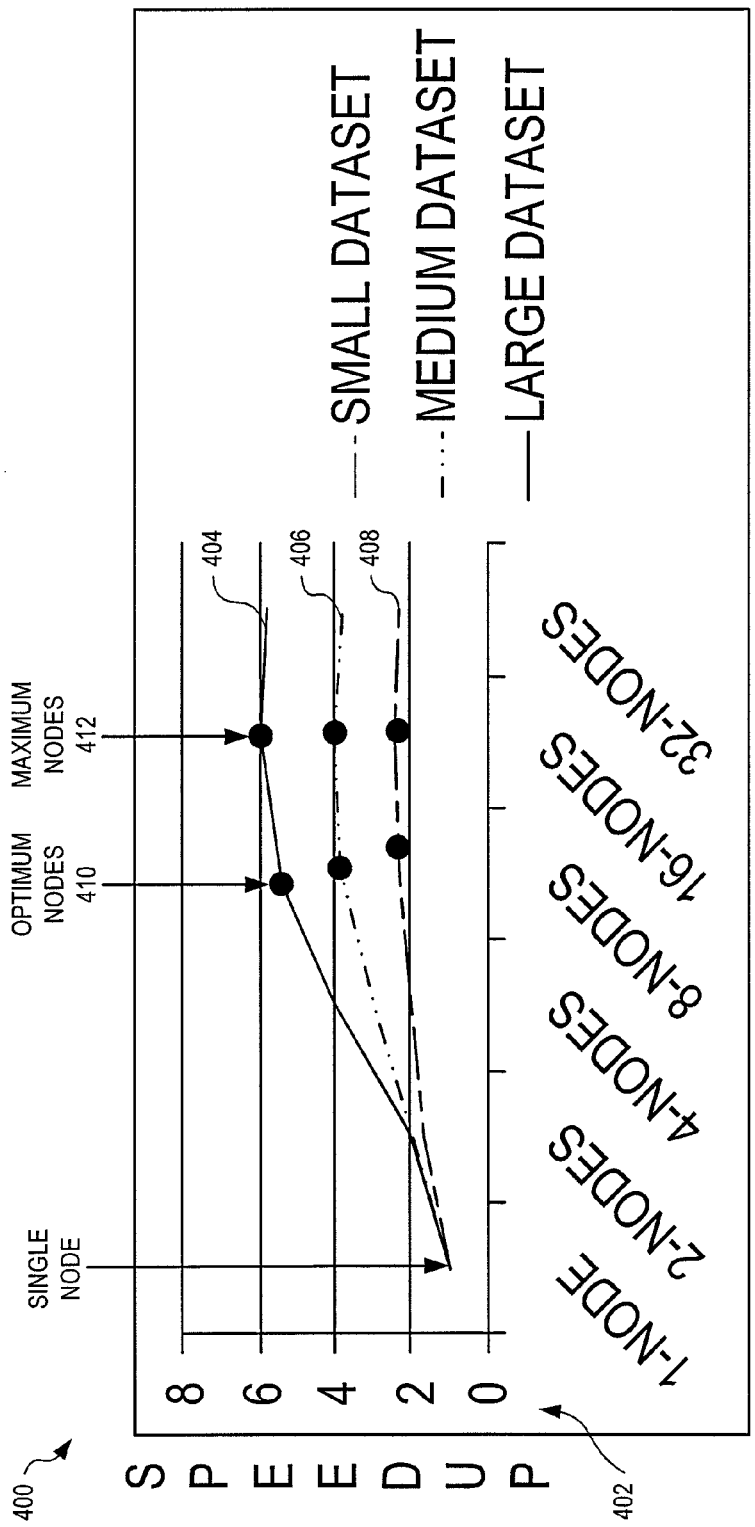
FIG. 4 shows one exemplary performance graph illustrating the average execution time of the algorithm of FIG. 2 to process three datasets of the same size for each of the small, medium, and large data set sizes, in an embodiment.

FIG. 4 shows one exemplary performance graph 400 illustrating the average performance (plotted as Amdahl speedup 402 representing the number of nodes equivalent performance) of algorithm 114 to process three datasets (e.g., test data 112) of the same size for each of the small, medium, and large data set sizes. Nine datasets (three of each size) are provided to system 100 such that calculations are statistically more relevant. A plotted line 404 (solid line) represents the average performance when processing the large dataset size, a plotted line 406 (dash-two dot line) represents the average performance when processing the medium dataset size, and a line 408 (dashed line) represents the average performance when executing the small dataset size. Each plotted line 404, 406, 408 also includes two data points illustrating an optimum node count 410 and a maximum node count 412 for executing algorithm 114 with that dataset size. The single node performance is always plotted at the beginning of the graph 400. The optimum node count for executing algorithm 114 occurs where the highest performance per node and highest node count occur. The optimum node count is calculated as follows:

$$O = \max(\sine(\alpha)(\text{no. of cores})) \quad \text{Equation 1}$$

The maximum node count occurs where either $\sine(\alpha) < 0$ or alternatively when the processing time increases from the previous iteration when the node count increases.

If the processing time of a larger dataset is ever less than the processing time for a smaller dataset then the algorithm is considered unpredictable.

Efficiency and Pricing

If the processing element count and the algorithm speedup are the same then the amount of electricity and cooling used is the same as that used by a single processing element working on the same problem. If the processing performance is greater than the number of processing elements (super-linear performance) then the amount of electrical power and cooling is less than that for a single processing element working on the same problem—this means that it is possible to have economy of scale, decreasing the total processing cost. If the processing performance is less than the number of processing element (sub-linear performance) then the amount of electrical power and cooling is more than that for a single processing element working on the same problem—this means that more should be charged for the processing. A minimum cost per use is calculated as follows.

$$\text{Min Cost Per Use} = (\text{Cost-Per-Node} * \#\text{-Nodes}) + \text{Application-Cost-Per-Use}$$

Display Models

Figure 5:
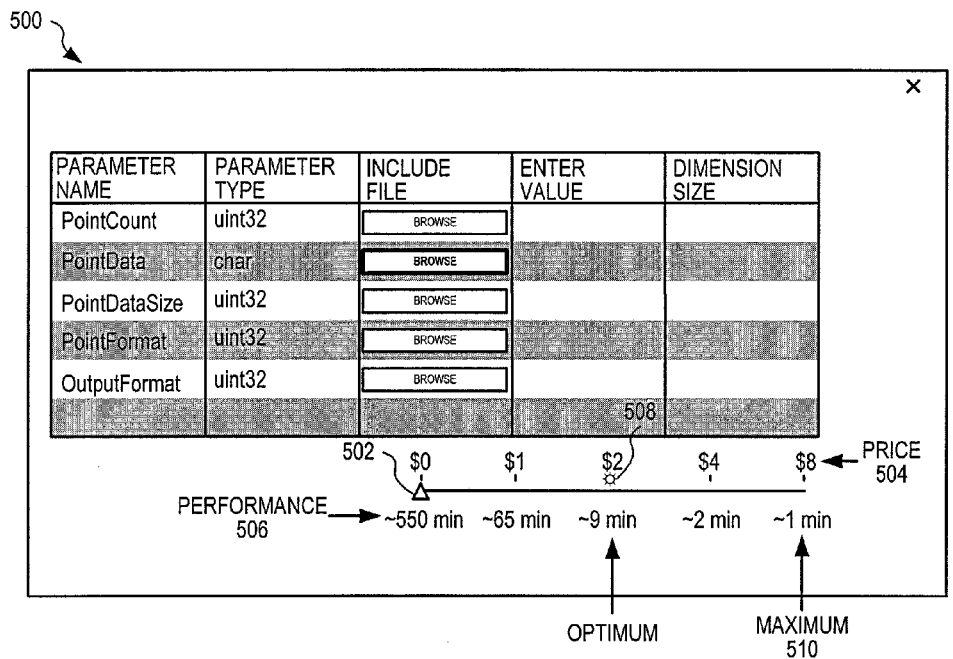
FIG. 5 shows one exemplary performance selection screen displayed to a consumer on a consumer computer, in an embodiment.

FIG. 5 shows one exemplary performance selection screen 500 displayed to consumer 168 on consumer computer 160 for example. Consumer 168 uses a performance slider 502 to select a desired processing performance for running algorithm 114 on cluster server 107. Slider 502 allows the consumer to select the desired processing performance 506 for executing algorithm 114 on server cluster 107, as indicated in estimated minutes of processing time and price 504 per minute of processing for example. Optimum performance 508 is indicated and a maximum performance 510 defines an upper selectable limit. Performance slider 502 range and displayed indication of processing time and cost is derived from determined performance of algorithm 114.

Figure 6:
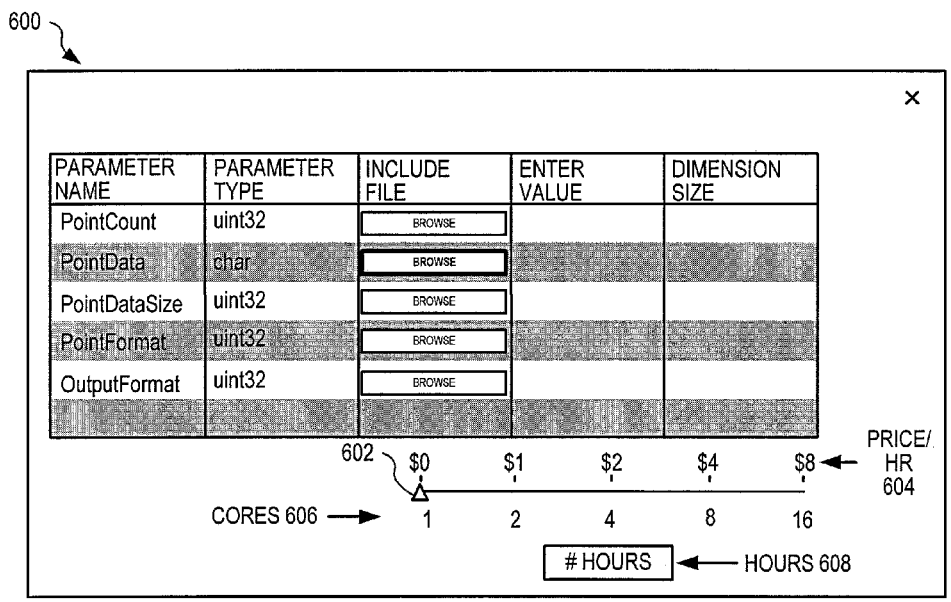
FIG. 6 shows one exemplary cost selection screen illustrating a slider that allows a consumer to select a number of processing elements for executing the algorithm of FIG. 2 based upon a defined cost per CPU hour and an estimated execution time, in an embodiment.

FIG. 6 shows one exemplary cost selection screen 600 illustrating a slider 602 that allows a consumer to select a number of processing elements 606 (e.g., cores) for executing algorithm 114 based upon a defined cost per CPU hour 604 and an estimated execution time 608.

Figure 7:
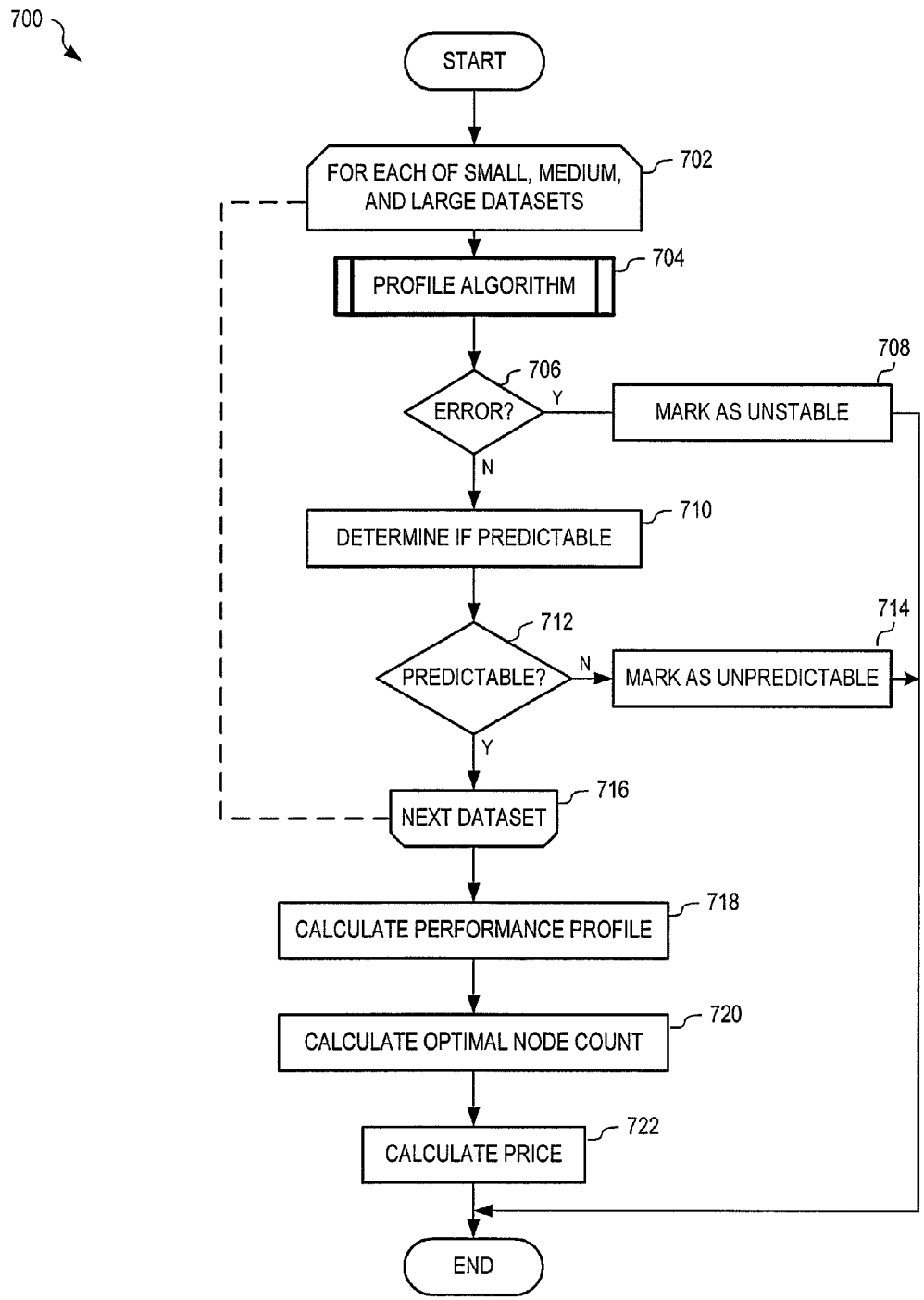
FIG. 7 is a flowchart illustrating one exemplary method for determining predictability, performance profile, and price of the algorithm of FIG. 2, in an embodiment.
Figure 8:
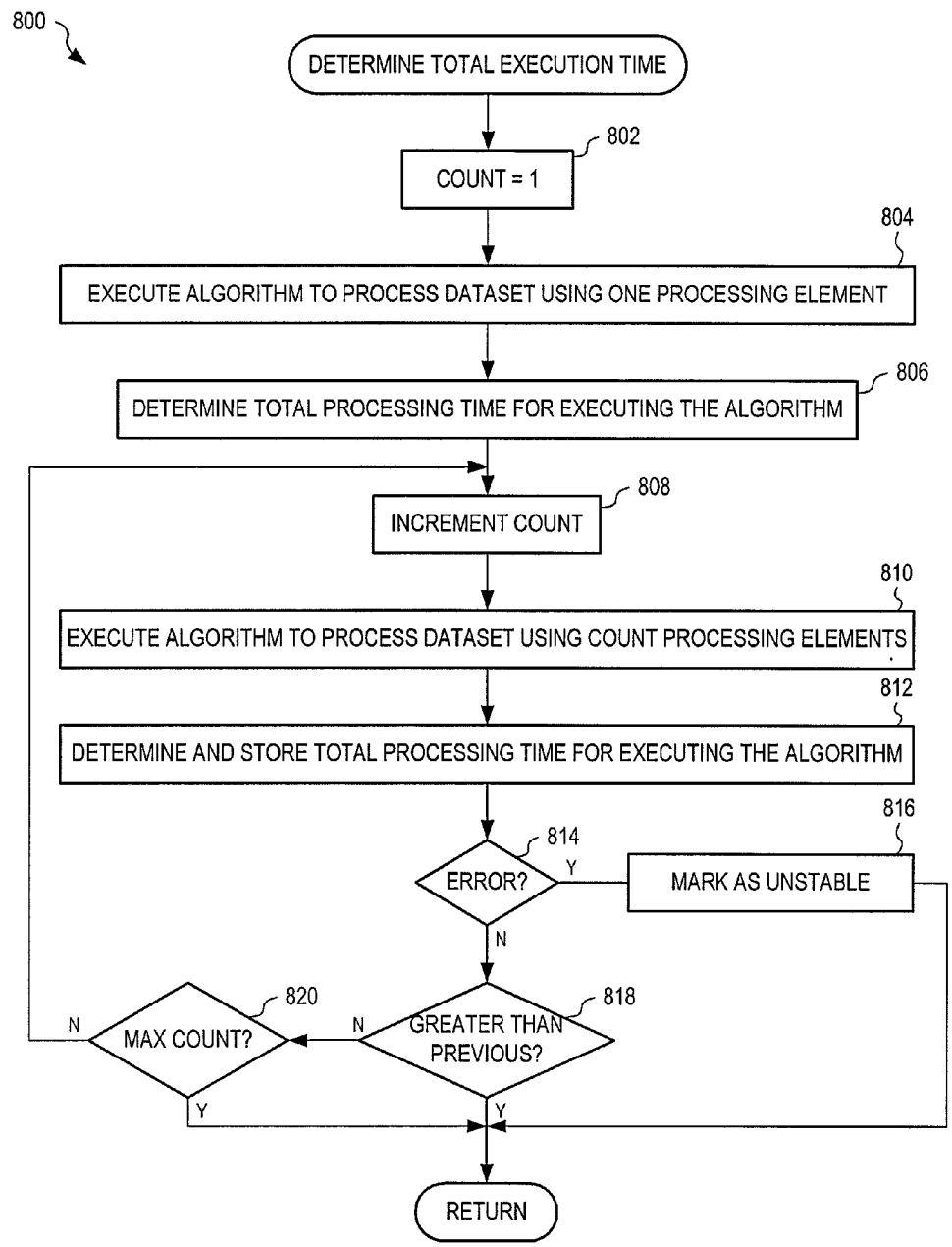
FIG. 8 is a sub-method this is invoked from the method of FIG. 7 to iteratively test the algorithm of FIG. 2 with a selected dataset, in an embodiment.

FIG. 7 is a flowchart illustrating one exemplary method 700 for determining predictability, performance profile, and price of algorithm 114. FIG. 8 is a sub-method 800 this is invoked from method 700 to iteratively test algorithm 114 with a selected dataset.

Steps 702 through 716 are repeated for each of a small dataset, a medium dataset, and a large dataset. In step 704, sub-method 800 of FIG. 8 is invoked to profile algorithm 114 using the current dataset. Step 706 is a decision. If, upon return from sub-method 800, step 706 determines that an error occurred, method 700 continues with step 708. In step 708, method 700 marks algorithm 114 as unstable and method 700 terminates. In step 710, method 700 determines whether algorithm 114 is predictable. In one example of step 710, profiler 108 analyzes total execution times determine for each iteration of sub-method 800 and if there erratic entries, method 700 continues with step 714; otherwise method 700 continues with step 716. In step 714, method 700 marks algorithm 114 as unpredictable and then terminates.

Once algorithm 114 has been tested for each dataset size, as selected by steps 702 through 716, step 718 calculates a performance profile for algorithm 114. In one example of step 718, profiler 108 plots a line on graph 400 of FIG. 4 for each dataset size.

In step 720, method 700 calculates an optimal node count for execution of algorithm 114 for each dataset size. In one example of step 720, profiler 108 utilizes Equation 1 to calculate an optimal node count for algorithm 114 based upon determined profile information.

In step 802, sub-method 800 sets a variable 'count' equal to one. In step 804, sub-method 800 executes the algorithm to process the dataset on one processing element. In one example of step 804, profiler 108 executes algorithm 114 with test data 112 on one processing element of cluster servers 107. In step 806, sub-method 800 determines a total processing time for executing the algorithm. In one example of step 806, profiler 108 interacts with cluster server 107 to determine a total execution time of algorithm 108.

Steps 808 through 820 form a loop. In step 808, sub-method 800 increments the count value at the start of each iteration through the loop. In step 810, sub-method 800 executes the algorithm to process the dataset using "count" processing elements. In one example of step 810, profiler 108 executes algorithm 114 to process test data 112 using "count" processing elements of cluster servers 107. In step 812, sub-method 800 determines and stores the total processing time for executing the algorithm. In one example of step 812, profiler 108 interacts with cluster server 107 to determine a total processing time for algorithm 114 to process test data 112.

Step 814 is a decision. If, in step 814, sub-method 800 determines that an error occurred during execution of the algorithm, method 800 continues with step 816; otherwise method 800 continues with step 818. In one example of step 814, the error occurs if the results data from processing of test data 112 by algorithm 114 is not within the defined results range. In another example of step 814, the error occurs if a fault within algorithm 114 halts processing. In step 816, method 800 marks the algorithm as unstable, and then sub-method 800 terminates. In one example of step 816, profiler 108 marks algorithm 114 as "unstable" within development environment 100.

Step 818 is a decision. If, in step 818, sub-method 800 determines that the total execution time for the algorithm is greater than the total execution time of the algorithm in a previous iteration of sub-method 800 for the same data set, method 800 terminates; otherwise sub-method 800 continues with step 820.

Step 820 is a decision. If, in step 8120, sub-method 800 determines that count has reaches a maximum processing element count, sub-method 800 terminates; otherwise sub-method 800 continues with step 808.

Steps 808 through 820 repeat until and one of the following conditions occur: an error occurs within the algorithm or incorrect results are returned, an increase in total execution time, and count reaches a maximum number of processing elements within cluster servers 107.

Combination of Features

Features described above as well as those claimed below may be combined in various ways without departing from the scope hereof. The following examples illustrate some possible combinations:

(A) A method for automatically determining a parallel performance profile of a parallel processing algorithm stored within memory, may include recording, via a profiler stored within the memory as computer readable instructions executable by a processor, the total execution time for the algorithm to process test data for each of a plurality of iterations.

(B) In the method denoted as (A), each of the plurality of iterations may use an increasing number of processing elements.

(C) In the methods denoted as (A) or (B), the first iteration may use one processing element.

(D) In the methods denoted as (A) through (C), the method may further include determining performance predictability of the algorithm based upon the determined execution time and processing errors.

(E) In the methods denoted as (A) through (D), the iterations may be stopped when an error occurs or when the total execution time for a current iteration is greater than the total execution time of the previous iteration.

(F) In the methods denoted as (A) through (E), the test data may comprise three sizes of data sets: a smallest data set, a medium data set and a large data set.

(G) In the method denoted as (F), the test data may comprise three sets of data for each size of data set.

(H) In the methods denoted as (F) and (G), the total execution time for each dataset size may be determined by averaging the execution time for each of the sets of data of that dataset size.

(I) In the methods denoted as (A) through (H), the method may further include determining pricing of the algorithm based upon the performance predictability and the determined execution time.

(J) In the methods denoted as (A) through (I), the method may further include determining the Amdahl speedup of the algorithm based upon execution time of the algorithm running on a single node and execution time of the algorithm running on multiple nodes.

(K) In the methods denoted as (A) through (J), the method may further include determining pricing of the algorithm based upon the number of processing elements and the cost per element.

(L) A system for automatically determining a parallel performance profile of a parallel processing algorithm may include a profile that comprises computer readable instructions stored on memory that when executed by a processor determine one or more of the following: performance predictability of the parallel processing algorithm, performance profile of the parallel processing and price of executing the parallel processing algorithm.

(M) The system denoted as (L), wherein the instructions for determining the performance predictability may include instructions for: recording a total execution time for the algorithm to process test data for each of a plurality of iterations.

(N) The system denoted as (M), wherein each iteration may use an increasing number of processing elements.

(O) The systems denoted as (M) and (N), wherein the first iteration uses one processing element.

(P) The systems denoted as (L) through (O), wherein the instructions further include determining the performance predictability of the algorithm based upon the determined execution time and processing errors.

(Q) The systems denoted as (M) through (P), wherein the iterations are stopped when the total execution time for a current iteration is greater than a total execution time of a previous iteration.

(R) The systems denoted as (M) through (Q), wherein the test data includes three sizes of sets: a smallest data set, a medium data set, and a large data set.

(S) The system denoted as (R) wherein the test data includes three sets of data for each size of data sets, and wherein the total execution time for each dataset size is determined by averaging the execution time for each of the sets of data of the respective dataset size.

(T) The systems denoted as (L) through (S), wherein the instructions for determining the price include determining the price of the algorithm based upon the performance predictability and the determined execution time.

(U) The systems denoted as (L) through (T), wherein the instructions for determining the profile of the algorithm include determining the Amdahl speedup of the algorithm based upon execution time of the algorithm running on a single processing element and execution time of the algorithm running on multiple processing elements.

(V) The system denoted as (U), wherein each of the processing elements corresponds to a respective processing server of a server cluster coupled to the system.

(W) The systems denoted as (L) through (V), wherein the instructions for determining pricing of the algorithm comprise determining the pricing based upon number of processing elements and the power consumption cost of each processing element.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for automatically determining a parallel performance profile of a parallel processing algorithm stored within memory, comprising:
    recording, via a profiler stored as computer readable instructions stored within the memory and executable by a processor, a total execution time for the algorithm to process test data for each of a plurality of iterations, wherein each iteration uses an increasing number of processing elements, and wherein the first iteration uses one processing element; and
    determining performance predictability of the algorithm based upon the determined execution time and processing errors;
    wherein the iterations repeat until an error occurs or until the total execution time for a current iteration is greater than the total execution time of a previous iteration.

2. The method of claim 1, wherein the test data comprises three sizes of data sets: a small sized data set, a medium sized data set and a large sized data set.

3. The method of claim 2, wherein each of the small, medium, and large sized data sets comprises three different sets of data, and wherein the total execution time for each size of data set is determined by averaging the execution time for each of the three different sets of data of that dataset size.

4. The method of claim 1, further comprising determining pricing of the algorithm based upon the performance predictability and the determined execution time.

5. The method of claim 1, further comprising determining Amdahl speedup of the algorithm based upon execution time of the algorithm running on a single node and execution time of the algorithm running on multiple nodes.

6. The method of claim 1, further comprising determining pricing of the algorithm based upon the number of processing elements and power consumption cost of each processing element.

7. A system for automatically determining a parallel performance profile of a parallel processing algorithm, comprising:
    a processor; and,
    a memory for storing a profiler having machine readable instructions that when executed by the processor determine a profile of the algorithm, the profiler comprising at least one of:
        instructions for determining performance predictability of the parallel processing algorithm, and
        instructions for determining price of executing the parallel processing algorithm.

8. The system of claim 7, the profiler further comprising:
    instructions for recording a total execution time for the algorithm to process test data for each of a plurality of iterations, wherein each iteration uses an increasing number of processing elements, and wherein the first iteration uses one processing element; and
    instructions for determining the performance predictability of the algorithm based upon the determined execution time and processing errors.

9. The system of claim 8, wherein the iterations repeat until the total execution time for a current iteration is greater than a total execution time of a previous iteration.

10. The system of claim 8, wherein the test data comprises three sizes of data sets: a small size data set, a medium size data set, and a large size data set.

11. The system of claim 10, wherein each of the small, medium, and large size data sets comprises three different sets of data, and wherein the total execution time for each of the small, medium, and large size data sets is determined by averaging an execution time for each of the different sets of data of the respective dataset size.

12. The system of claim 7, wherein the instructions for determining the price include instructions for determining the price of the algorithm based upon the performance predictability and the determined execution time.

13. The system of claim 7, wherein the instructions for determining the profile of the algorithm comprise instructions for determining the Amdahl speedup of the algorithm based upon execution time of the algorithm running on a single processing element and execution time of the algorithm running on multiple processing elements.

14. The system of claim 13, wherein each of the processing elements corresponds to a respective processing server of a server cluster coupled to the system.

15. The system of claim 7, wherein the instructions for determining pricing of the algorithm comprise instructions for determining the pricing based upon the number of processing elements and power consumption cost of each processing element.

* * * * *